(No Model.)
S. COOLEY.
CAR COUPLING.
No. 393,693. Patented Nov. 27, 1888.
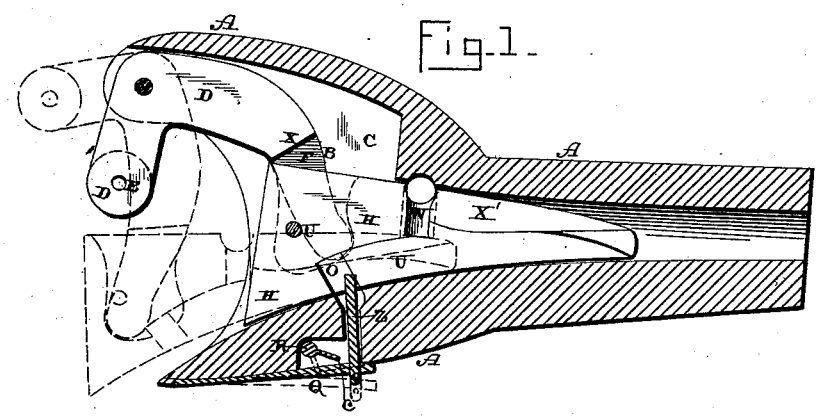
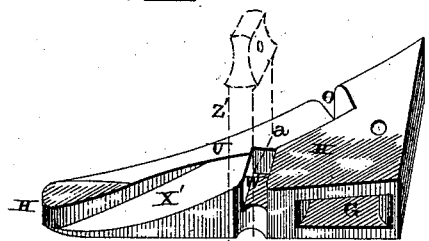
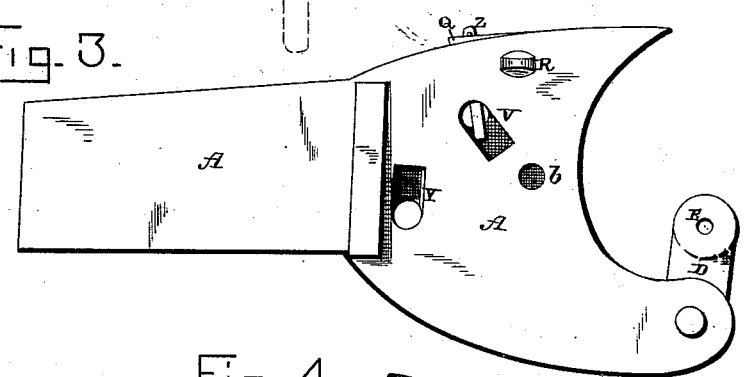
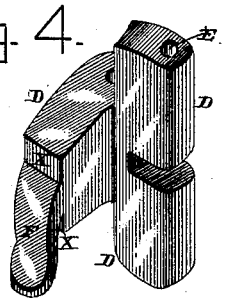
Witnesses:
E. P. Ellis
L. L. Burket
Inventor:
Sam¹ Cooley,
per J. A. Lehmann,
Atty.

United States Patent Office.

SAMUEL COOLEY, OF FLEMINGTON, NEW JERSEY.

CAR-COUPLING.

SPECIFICATION forming part of Letters Patent No. 393,693, dated November 27, 1888.

Application filed September 14, 1888. Serial No. 285,426. (No model.)

*To all whom it may concern:*

Be it known that I, SAMUEL COOLEY, of Flemington, in the county of Hunterdon and State of New Jersey, have invented certain new and useful Improvements in Automatic Car-Couplings; and I do hereby declare the following to be a full, clear, and exact description of the invention, such as will enable others skilled in the art to which it pertains to make and use it, reference being had to the accompanying drawings, which form part of this specification.

My invention relates to an improvement in automatic car-couplings; and it consists in the combination of the hollow draw-head, a pivoted hook provided with an arm, prong, or projection, a sliding block in which the arm or projection catches and which block moves back and forth in the hollow portion of the draw-head, and the locking pin or bolt by means of which the block and hook are locked in position, all of which will be more fully described hereinafter.

The object of my invention is to provide an automatic car-coupling by means of which the cars can be automatically coupled when they run together, and thus prevent the necessity of the brakemen having to venture between the cars.

Figure 1 represents a horizontal section of a car-coupling which embodies my invention, showing the parts in one position in solid lines and in another position in dotted lines. Fig. 2 is a perspective of the sliding block used in connection with one form of locking-pin. Fig. 3 is a plan view of the coupling. Fig. 4 is a perspective of the hook alone.

A represents the draw-head, which is preferably made of the shape here shown, and which is made hollow its whole length. In the opening near the front end of the draw-head are formed the shoulder B and the groove or recess C, into which the projection upon the hook moves when the hook is closed. Pivoted at the outer corner of this draw-head is the hook D, which will be preferably made of the shape here shown, and which has its inner end formed into a prong or projection, F, which catches in the recess G, formed in the sliding block H, and is provided with the shoulders X for catching against the side of the block. This block H slides endwise back and forth in the opening made in the hollow draw-head and is moved by the prong or projection upon the hook. When the hook is opened, the prong or projection moves the block forward out of the draw-head, as shown in dotted lines, and the block is then in position to be struck by the advancing point of the hook upon the opposing draw-head, and as the block is forced backward it causes the hook to close and thus engage with the hook upon the opposing draw-head. When the block is moved by the opposing draw-head, it operates the hook; but when the hook is operated for the purpose of opening the coupling it operates the block.

For the purpose of locking the hook and the block in position when it is closed there is formed a recess, O, in the side of the block, and in this recess the pin Z, which is actuated by the spring Q, secured to the side of the draw-head, is made to catch. This pin projects inwardly through the side of the draw-head, and as the block is forced backward the pin is forced outward by the block until the opening or recess is reached, and then the pin snaps into it, so as to lock the block and hook in a closed position. Passing vertically down through the draw-head is an operating-pin, R, which is provided with an arm, projection, or cam, c, which strikes against the inner side of the spring, and by turning the pin the arm or projection strikes against the inner side of the spring and forces the locking-pin out, when the hook and the block are left free to move. Shoulders X are formed upon the hook just where the prong or projection begins, and these shoulders X strike against the side of the block and help to hold it in position when the block is forced outward. Should it be desired to lock the hook and the block rigidly in position, an ordinary coupling-pin, U, is passed down through the opening b made in the front end of the draw-head and the front of the block, as shown. This pin need not necessarily be used, but it can be used when so desired. Through the outer end of the hook is made a suitable opening, in which the ordinary coupling-links are made to catch, and a vertical hole, E, is made through this portion of the hook, so that a coupling-pin can be dropped down through it to make connection with the link. This enables a draw-head of this construction to be coupled with a car having an ordinary pin-and-link coupling.

In Fig. 2 is shown a second form of locking-pin, which may be used in case it is not desired to use the spring-actuated pin shown in Fig. 1. The sliding block is beveled upon one edge of its rear end, as shown at X', and passing through an opening, Y, (shown in Fig. 3,) is a vertically-moving locking-pin, which is provided with the shoulder $a$, which rests upon this inclined part X', and is automatically raised as the block is forced backward into the draw-head. The pin Z' has its shoulder $a$ to rest upon this inclined surface X', and as the block is forced backward the inclined surface raises the pin until the notch W in the edge of the block is reached, when the pin drops into this notch and locks the block in position. Through the top of the draw-head is formed a second opening, V, through which another pin may be passed, and which pin will have its lower end rest upon the beveled surface U and be operated by the block as the block is forced back until the notch is reached. These locking-pins may be used in addition to the spring-actuated pin here shown, or they may be used independently and separately, just as may be preferred. One pin will generally be found sufficient; but two or more may be used if it is so desired. I do not limit my invention in this respect, because various forms of locking devices may be used to hold the sliding block in position. As a general thing the spring-lock will be best for passenger-cars, while the vertical pin provided with the shoulder will be used for freight-cars.

Having thus described my invention, I claim—

1. The combination of the hollow draw-head, the hook pivoted thereto, a block which moves back and forth in the draw-head and which is loosely connected to the hook, and locking pin or bolt, substantially as shown.

2. The combination of a hollow draw-head, the pivoted hook provided with an arm or projection upon its inner end, the sliding block provided with an opening in its front end for the arm or projection to catch in, a spring-actuated locking-pin, and a pin provided with an arm or projection for operating the pin, substantially as set forth.

3. The combination of a hollow draw-head and a pivoted hook provided with an arm or projection upon its inner end, with the sliding block provided with an opening in its front end for the arm or projection to catch in, and a locking-bolt provided with a shoulder which extends vertically through the draw-head and is operated by the inclined portion of the sliding block, substantially as described.

In testimony whereof I affix my signature in presence of two witnesses.

SAMUEL COOLEY.

Witnesses:
J. P. BODINE,
J. S. COOLEY.